United States Patent [19]
Huston

[11] Patent Number: 5,816,757
[45] Date of Patent: Oct. 6, 1998

[54] UTILITY TRAILER RETAINING BAR HOLD DOWN CLAMP

[76] Inventor: Ronald Wayne Huston, HC3, Box 6, Wannaska, Minn. 56761

[21] Appl. No.: 777,875

[22] Filed: Dec. 31, 1996

[51] Int. Cl.⁶ ....................................................... B60P 7/08
[52] U.S. Cl. ........................ 410/3; 410/2; 410/7; 410/30
[58] Field of Search .............................. 410/2–4, 7, 9–11, 410/19, 30, 81; 248/500; 188/32

[56] References Cited

U.S. PATENT DOCUMENTS

| | | | |
|---|---|---|---|
| 1,828,579 | 8/1931 | Snyder | 410/30 |
| 3,672,523 | 6/1972 | Albert | 410/3 X |
| 3,730,552 | 5/1973 | Clark | 410/3 |
| 3,885,690 | 5/1975 | Van Slambrouck | 410/3 X |
| 3,955,847 | 5/1976 | Schiowitz | 410/4 X |
| 4,068,813 | 1/1978 | Chafwin et al. | 410/7 |
| 4,580,935 | 4/1986 | Treihaft | 410/3 |
| 4,659,266 | 4/1987 | Thelen et al. | 410/30 X |
| 4,671,713 | 6/1987 | Lenkman | 410/7 |
| 5,044,845 | 9/1991 | Baker, Jr. | 410/3 |
| 5,203,655 | 4/1993 | Persau | 410/3 |
| 5,387,070 | 2/1995 | Roeling | 414/483 |
| 5,429,286 | 7/1995 | Foust . | |
| 5,553,882 | 9/1996 | Unruh | 410/3 X |
| 5,607,270 | 3/1997 | Zimmerman | 410/3 |

FOREIGN PATENT DOCUMENTS 2-6244A  1/1990  Japan .......................................... 410/2

OTHER PUBLICATIONS

Trailer Vise Advertisement Showing the Outdoor Innovations, Inc. ATV Trailer Vise (1 page).

Primary Examiner—Stephen T. Gordon
Attorney, Agent, or Firm—Curtis V. Harr

[57] ABSTRACT

The present inventions discloses an apparatus that may be used to quickly and easily adapt a typical snowmobile trailer and hold down system to a clamping type system. This system may then be used to hold and secure not only snowmobile but all terrain vehicles and lawn tractors to the bed of a trailer. These objectives are accomplished by the use of a clamp like device that bolts to the bed of a utility trailer. This clamp is used in conjunction with the commonly used retaining bar typically used to secure the skies of a snowmobile to the trailer. The clamp of the present invention provides a quick and secure way to fix the vehicle to the trailer and can be easily locked to deter the theft of the vehicle when it is left unattended.

13 Claims, 5 Drawing Sheets

UTILITY TRAILER RETAINING BAR HOLD DOWN CLAMP

BACKGROUND OF THE INVENTION

The present invention relates to an improvement in the manner in which specialty vehicles, such as a snowmobiles, all terrain vehicles (ATV's), or lawn tractors, are secured to utility trailers. More specifically, to a manner of securing such vehicles to a utility trailer that is easier, less time consuming and more secure than the methods previously available.

In the past, there were basically two methods of securing such vehicles to a utility trailer. The first was to simply tie the vehicle to the bed of the trailer using rope or tie down straps. While this method works, it has many disadvantages. It is very time consuming as one must use a number of ropes and tie numerous knots in order to effectuate the securement to the trailer. It is also a risky method as any one of the knots, attachment points, or ropes may loosen resulting in possible damage to the vehicle. Finally, it is very difficult, if not impossible, to secure the vehicle in such a manner that prevents it from being removed by another while unattended.

Another means of securing such vehicles to the bed of a utility trailer is a bar that attaches to the trailer by the use of a crank-like bolt that threads into the bed of the trailer. This method is commonly used on modern flatbed snowmobile trailers. The snowmobile is parked upon the trailer and bar is placed horizontally across the skis of the snowmobile. This bar is supplied with a tube or circular section in the middle of the bar. A crank with a threaded end is placed through the circular section in the middle of the bar and tightened to a female threaded portion on the bed of the trailer. The crank is then secured to a point that sufficiently draws the bar against the skis of the snowmobile holding it to the bed of the trailer. Although this is a more effective method than the one previously described, it has some inherent problems. Often it is difficult to properly tighten the crank as the body or hood of a snowmobile often interferes with the rotation of the crank. This problem can result in improper tightening of the crank, and possible damage to the vehicle as the crank may hit the hood of the snowmobile. Another problem is that it is difficult to secure the vehicle in a manner that will deter its theft when unattended. Although this method can be troublesome it is an effective method of securing snowmobiles to a trailer. However, this method does not allow for the securing of wheeled vehicles such as ATV's or lawn tractors.

From the foregoing discussion it can be seen that it would be highly desirable to provide a method of quickly and easily securing specialty vehicles to a utility trailer, such as a common snowmobile trailer, in a simple manner. It is also desirable to create a method of attaching four wheeled vehicles such as ATV's and lawn tractors to a flatbed utility snowmobile trailer with minimal modification to the trailer and attachment system. The Utility Trailer Retaining Bar Hold Down Clamp allows a user to secure a specialty vehicle to a utility trailer quickly in a manner that will both assure a reliable attachment and provide a method of securing the vehicle in a manner that will deter its removal while unattended.

SUMMARY OF THE INVENTION

It is the primary objective of the present invention to provide a means of attaching specialty vehicles such as snowmobiles and four wheeled vehicles to the bed of a utility trailer, such as a common snowmobile trailer, with minimal modification, in an easy and efficient manner.

It is an additional objective of the present invention to provide a means of attaching a specialty vehicle to the bed of a utility trailer in a reliable manner that will insure the vehicles safety during transport.

It is still a further objective of the present invention to provide a means of attaching such vehicles to a utility trailer in a manner that it can be easily locked to deter theft while unattended.

These objectives are accomplished by the use of a clamp like device that bolts to the bed of a utility trailer. This clamp is used in conjunction with the commonly used retaining bar typically used to secure the skies of a snowmobile to the trailer. The novelty of the present invention is that it provides a quick and secure way to fix the vehicle to the trailer and can be easily locked to deter the theft of the vehicle when it is left unattended.

The present invention utilizes a pivoting bar that acts like a clamp on the retaining bar by exerting downward pressure on the retaining bar when it is engaged to the skis of a snowmobile. The pivoting bar can then be locked into place by the use of pins or a padlock that pass through the vertically positioned adjustment bars. Additionally, the anchor bar of the present invention is fastened to the bed of the utility trailer with bolts that have special head protectors that make it impossible to remove with anything but a socket wrench. This is important because when the pivoting bar is locked into position, it is impossible to get a socket wrench on the head of the attachment bolts.

The same pivoting bar that acts like a clamp may be used to attach four wheeled vehicles, such as ATV's or lawn tractors. In this configuration the horizontal retaining bar is supplied with triangular wheel chocks and affixed to the bed of the trailer across the anchor portion of the clamp. The pivoting bar is supplied with a chain retaining block which is used to hold a chain that may be attached to the underside of the vehicle. Thus when the clamp is tightened and locked in place the chain will be tightened which will in turn pull the vehicle's front wheels firmly against the retaining bar wheel chocks. The pivoting bar can then be locked into place by the use of pins or padlocks that would pass through the vertically positioned adjustment bars. Again, the anchor bar of the present invention is fastened to the bed of the utility trailer with bolts that have special head protectors that make it impossible to remove the bolts with anything but a socket wrench. This is important because when the pivoting bar is locked into position, it is impossible to get a socket wrench on the head of the attachment bolts. Thus, the vehicle will be locked securely in place.

For a better understanding of the present invention reference should be made to the drawings and the description in which there are illustrated and described preferred embodiments of the present invention.

DESCRIPTION OF THE PREFERRED EMBODIMENT

Figure 1:
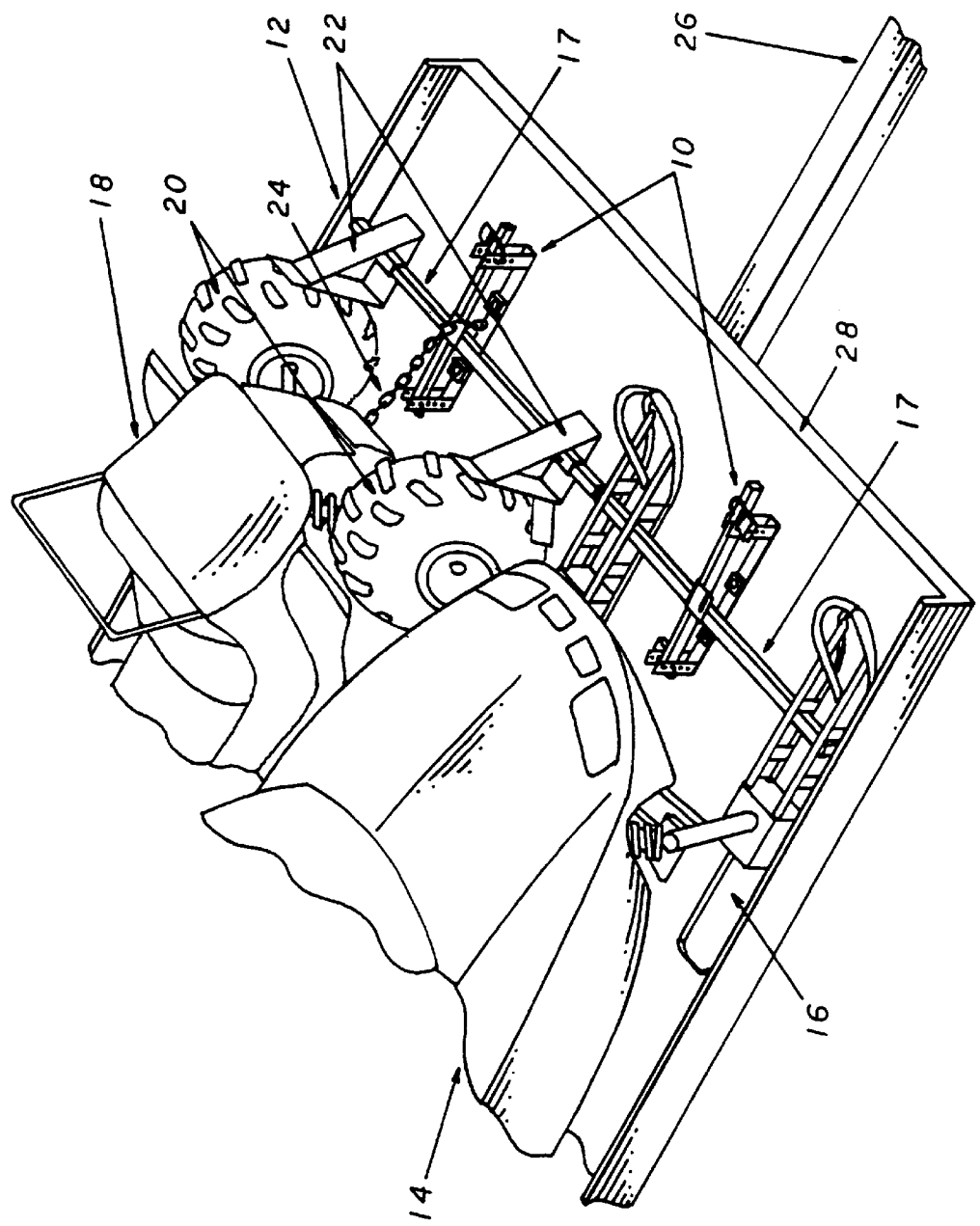
FIG. 1 is a perspective view of the Utility Trailer Retaining Bar Hold Down Clamp showing the manner in which it is used to secure specialty vehicles, such as a snowmobile or an all terrain vehicle, to a utility trailer.

Referring now to the drawings, and more specifically to FIG. 1, the Utility Trailer Retaining Bar Hold Down Clamp 10 is mounted to the trailer bed 28 of a utility trailer 12 just behind the trailer tongue 26. In this manner, it provides the attachment point for the retaining bar 17 which can be used to secure the front skis 16 of a snowmobile 14 to the trailer 12. In an alternative configuration, the present invention may also be used to secure an all terrain vehicle 18 to the utility trailer 12. Here, a retaining chain 24 is attached at one end to the front of the all terrain vehicle 18 and at the other end to the Utility Trailer Retaining Bar Hold Down Clamp 10. When the present invention is locked in place, the front tires 20 of the vehicle are pulled against the wheel chocks 22, which are in turn attached to the retaining bar 17 which is attached to the trailer bed 28. Thus, the present invention allows for the secure attachment of a variety of specialty vehicles to a utility trailer 12.

Figure 2:
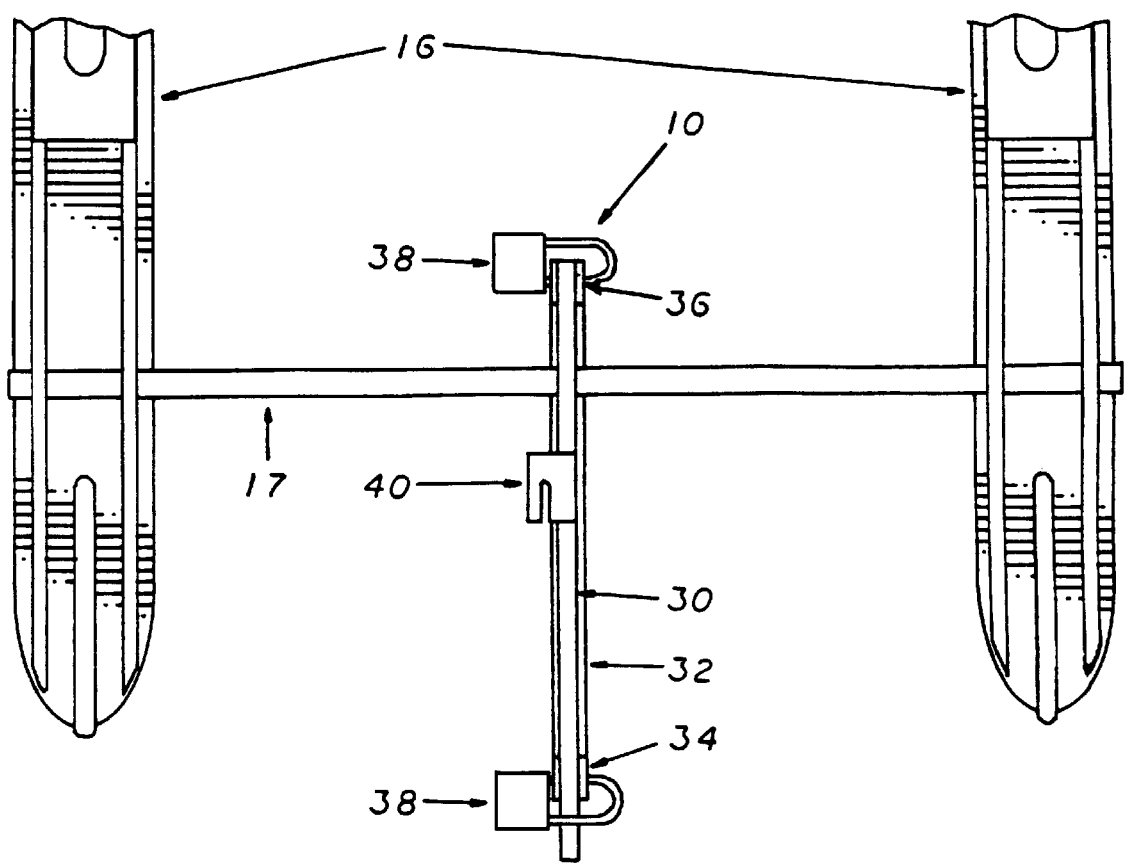
FIG. 2 is a top elevation view of the present invention showing the way it engages the skis of a snowmobile to secure it to the bed of a trailer.
Figure 3:
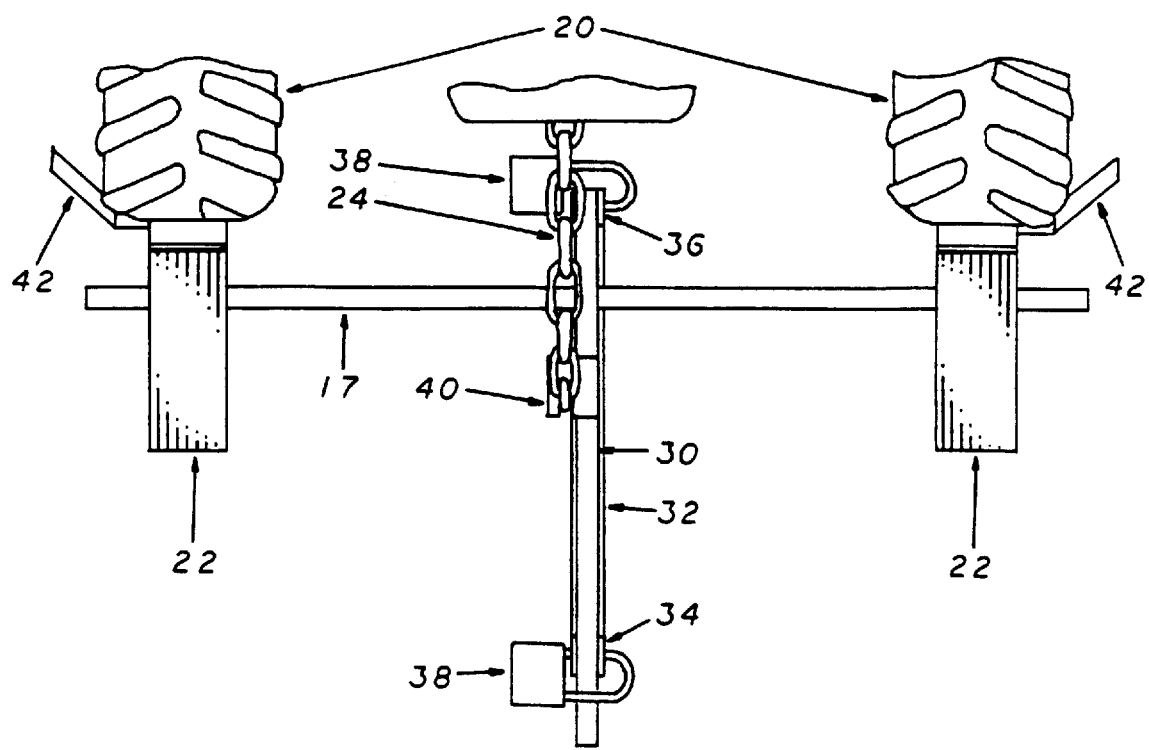
FIG. 3 is a top elevation view of the present invention showing the way it engages an all terrain vehicle through the wheel chocks and retaining chain to secure the all terrain vehicle to the bed of the trailer.

FIGS. 2 and 3 depict the manner in which the present invention engages a typical specialty vehicle in securing that vehicle to a utility trailer 12. In the case of a snowmobile 14, the retaining bar 17 fits into or over the front skis 16 at its most outward ends and underneath the pivoting upper clamp bar 30 at its center. The pivoting upper clamp bar 30 is then locked into such a position on the front adjustment bar 34 and the rear adjustment bar 36 (which are vertically attached at either end of the anchor bar 32), that it exerts enough downward force on the retaining bar 17 to securely hold the skis 16, and therefore the snowmobile 14, in place. The pivoting upper clamp bar 30 is locked in place on the front and rear adjustment bars, 34 and 36, by the use of padlocks 38 which ensure that the present invention can not be opened by a thief. A permanently attached pin such as a bolt with a welded nut (not shown) may also be used in place of a padlock 38 on the rear adjustment bar 36.

Figure 5:
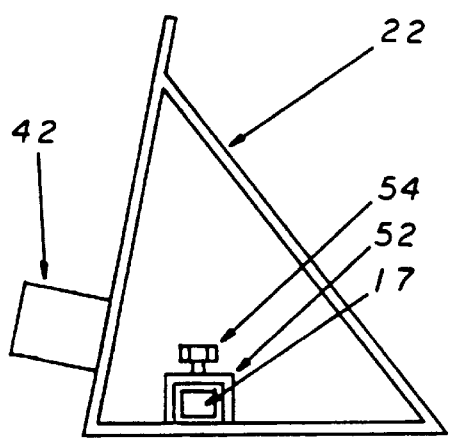
FIG. 5 is a side elevation view of the wheel chock components of the present invention showing the manner in which it is attached to the retaining bar.

Referring now to FIG. 3, in the case of attaching an all terrain vehicle 18 or lawn tractor to a utility trailer 12, the configuration of the present invention is basically the same as described above with the following differences. Attached to either outside end of the retaining bar 17 are located the wheel chocks 22 which provide a solid anchoring point for the front tires 20 of the vehicle. The wheel chocks 22 are constructed in a manner that a wheel chock retaining channel 52 spans the inner, lower surface of the wheel chock 22. The retaining bar 17 then is passed through the wheel chock retaining channel 52 to the desired point and locked in place by the retaining bar hold down bolt 54 (this configuration is diagramed in FIG. 5). Also attached to the wheel chocks 22 on the opposite outside surfaces are the outside wheel retainers 42 which keep the all terrain vehicle 18 from sliding outside of the wheel chocks 22. The retaining bar 17 is then typically fastened to the trailer bed 28.

The vehicle is secured to the present invention by the use of a retaining chain 24 which runs from the all terrain vehicle 18 to the retaining chain attachment block 40 located on the pivoting upper clamp bar 30. After securing the rear end of the pivoting upper clamp bar 30 to the rear adjustment bar 36, the user places the retaining chain 24 in the retaining chain attachment block 40, which contains a chain receiving slot. The user then pushes the pivoting upper clamp bar 30 downward until it engages the front adjustment bar 34 where it is locked into place with a padlock 38. With this configuration, a wheeled vehicle can be easily and securely mounted on a utility trailer 12.

Figure 4:
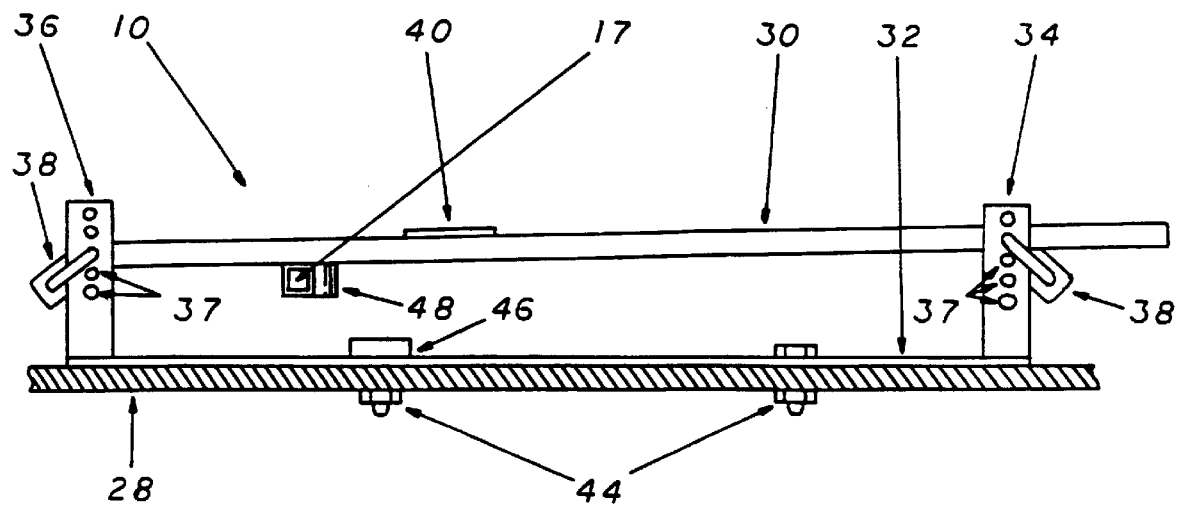
FIG. 4 is a side elevation view of the present invention showing the orientation of its major components and the manner in which it is attached to the bed of the trailer.
Figure 7:
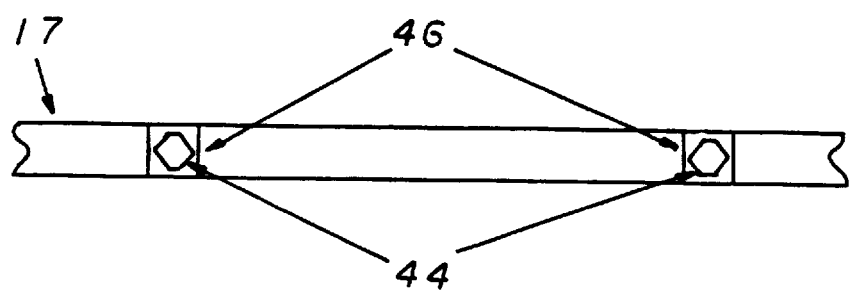
FIG. 7 is a top elevation view of the anchor bar component of the present invention showing the construction of the anti-theft bolt head protectors.

The clamp portion of the present invention (as shown in FIG. 4) is constructed by the use of an anchor bar 32 which is permanently attached to the trailer bed 28 by the bed attachment bolts 44. The upper heads of the bed attachment bolts 44 are recessed into the anti-theft bolt head protectors 46 which prevent any tool but a socket wrench from engaging the bolt head (this configuration is clearly diagramed in FIG. 7). The importance of this design feature is that when the pivoting upper clamp bar is in the locked position, there is not enough room between the bed attachment bolts 44 and the lower surface of the pivoting upper clamp bar 30 to fit a socket wrench into to engage and remove the bed attachment bolts. Thus, it is impossible to remove the present invention from the trailer bed 28 to steal a mounted vehicle.

Figure 6:
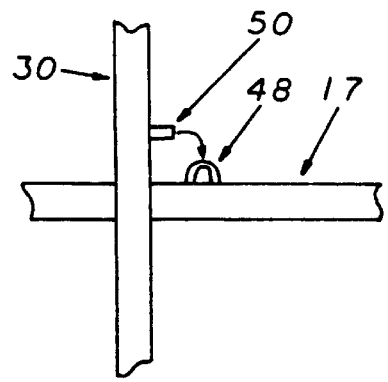
FIG. 6 is a top elevation view of the retaining bar and the upper clamp bar components of the present invention showing the manner in which the two fit together by the use of the positioning pin and the positioning pin receptacle.

Either end of the anchor bar has vertically attached to it the front and rear adjustment bars, 34 and 36. These adjustment bars, 34 and 36, have drilled into their surfaces a series of corresponding adjustment holes 37 which provide the mounting point for the pivoting upper clamp bar 30. The user simply chooses the correct position for the clamp bar 30 on the rear adjustment bar 36 and locks it into place with a padlock 38. He then pivots the front portion of the clamp bar 30 downward until enough force is exerted on the retaining bar 17, which engages the clamp bar 30 by means of the positioning pin 50 and the positioning pin receptacle 48 (as shown in FIG. 6), to hold the snowmobile 14 in place, and locks it into place on the front adjustment bar 34, again using a padlock 38 to lock it within the adjustment holes 37.

Although the present invention has been described in considerable detail with reference to certain preferred versions thereof, other versions are possible. Therefore, the spirit and scope of the appended claims should not be limited to the description of the preferred versions contained herein.

What is claimed is:

1. A utility trailer hold down clamp system for securing a snowmobile having front skis to a trailer said clamp system comprising:

an elongate retainer bar for placement across the front skis of said snowmobile;

a lower anchor bar fixedly attached to the bed of said trailer said anchor bar having a front and rear portion;

a front and rear adjustment bar extending upward from and fixedly attached to the respective front and rear portions of said anchor bar;

an upper bar having a front, center and rear portion;

a means of pivotally attaching said front and rear portion of said upper bar to the respective front and rear adjustment bar; and a means of securing said retainer bar on or about said center portion of said upper bar so that said upper bar may be used as a lever to place downward force upon said retainer bar and hold said snowmobile in position about said snowmobile skis.

2. A hold down clamp system as in claim 1 wherein said means of securing said retainer bar on said upper bar comprises a pin fixedly attached to said upper bar and a receptacle for receiving said pin on said retaining bar.

3. A hold down clamp system as in claim 2 wherein said anchor bar further comprises bolt protectors and said anchor bar is fixedly attached to said bed of said trailer via bolts and said bolt protectors so that said bolts may only be removed using a socket type wrench.

4. A hold down clamp system as in claim 3 wherein said means of pivotally attaching said front and rear portion of said upper bar to the respective front and rear adjustment bar comprises a pair of padlocks and said front and rear adjustment bars define a plurality of adjustment holes to receive said upper bar in a pinned arrangement utilizing a respective said padlock as a pin.

5. A hold down clamp system as in claim 3 wherein said means of pivotally attaching said front and rear portion of said upper bar to the respective front and rear adjustment bar comprises a pair of pins with said front and rear adjustment bars defining a plurality of adjustment holes to receive said upper bar and a respective said pin in a pivotally pinned arrangement.

6. A hold down clamp system as in claim 3 wherein said means of pivotally attaching said front and rear portion of said upper bar to the respective front and rear adjustment bar comprises a permanent pivotal attachment joint between the rear portion of said upper bar and said rear adjustment bar with said front adjustment bar defining a plurality of adjustment holes to connect with the front portion of said upper bar.

7. A utility trailer hold down clamp system for securing four wheeled vehicles having a pair of front wheels and a pair of rear wheels to a trailer said clamp system comprising:

a retainer bar fixedly attached to the bed of said trailer across the front of said four wheeled vehicle;

a lower anchor bar fixedly attached to the bed of said trailer, said anchor bar having a front and rear portion;

a front and rear adjustment bar extending upward from and fixedly attached to the respective front and rear portions of said anchor bar;

an upper bar having a front, center and rear portion of said upper bar;

a means of pivotally attaching said front and rear portion of said upper bar to the respective front and rear adjustment bar; and a means of attaching a chain on or about said center portion of said upper bar so that as said upper bar is used as a lever, said chain places downward force upon said four wheeled vehicle to hold said vehicle in place against said retainer bar.

8. A hold down clamp system as in claim 7 further comprising a pair of triangular wheel chocks fixedly attached to the said retainer bar so as to line up with the front wheels of said four wheeled vehicle.

9. A hold down clamp system as in claim 8 wherein said means of attaching a chain on said upper bar comprises a chain attachment block defining a slot to receive a link of said chain.

10. A hold down clamp system as in claim 9 wherein said anchor bar further comprises bolt protectors and said anchor bar is fixedly attached to said bed of said trailer via bolts and said bolt protectors so that said bolts may only be removed using a socket type wrench.

11. A hold down clamp system as in claim 9 wherein said means of pivotally attaching said front and rear portion of said upper bar to the respective front and rear adjustment bar comprises a pair of padlocks and said front and rear adjustment bars define a plurality of adjustment holes to receive said upper bar in a pinned arrangement utilizing a respective said padlock as a pin.

12. A hold down clamp system as in claim 9 wherein said means of pivotally attaching said front and rear portion of said upper bar to the respective front and rear adjustment bar comprises a pair of pins with said front and rear adjustment bars defining a plurality of adjustment holes to receive said upper bar and a respective said pin in a pivotally pinned arrangement.

13. A hold down clamp system as in claim 9 wherein said means of pivotally attaching said front and rear portion of said upper bar to the respective front and rear adjustment bar comprises a permanent pivotal attachment joint between the rear portion of said upper bar and said rear adjustment bar with said front adjustment bar defining a plurality of adjustment holes to connect with the front portion of said upper bar.

\* \* \* \* \*